US011481142B2

(12) United States Patent
Shi

(10) Patent No.: US 11,481,142 B2
(45) Date of Patent: Oct. 25, 2022

(54) METHOD AND DEVICE FOR DOWNLOADING RESOURCES

(71) Applicant: Alibaba Group Holding Limited, Grand Cayman (KY)

(72) Inventor: Jie Shi, Beijing (CN)

(73) Assignee: Alibaba Group Holding Limited, Grand Cayman (KY)

( * ) Notice: Subject to any disclaimer, the term of this patent is extended or adjusted under 35 U.S.C. 154(b) by 179 days.

(21) Appl. No.: 16/957,059

(22) PCT Filed: Dec. 17, 2018

(86) PCT No.: PCT/CN2018/121445
§ 371 (c)(1),
(2) Date: Jun. 22, 2020

(87) PCT Pub. No.: WO2019/120157
PCT Pub. Date: Jun. 27, 2019

(65) Prior Publication Data
US 2021/0064270 A1    Mar. 4, 2021

(30) Foreign Application Priority Data

Dec. 22, 2017  (CN) .......................... 201711406746.2

(51) Int. Cl.
| G06F 3/06 | (2006.01) |
| G11B 5/596 | (2006.01) |
| H04L 47/74 | (2022.01) |
| H04L 47/70 | (2022.01) |
| H04L 67/1061 | (2022.01) |

(52) U.S. Cl.
CPC .......... *G06F 3/0653* (2013.01); *G06F 3/0604* (2013.01); *G06F 3/067* (2013.01); *G11B 5/59683* (2013.01); *H04L 47/748* (2013.01); *H04L 47/827* (2013.01); *H04L 67/1065* (2013.01)

(58) Field of Classification Search
None
See application file for complete search history.

(56) References Cited

U.S. PATENT DOCUMENTS

| 7,920,572 B2 | 4/2011 | Bates et al. |
| 7,945,694 B2 | 5/2011 | Luzzatti et al. |
| 8,112,479 B2 | 2/2012 | Guan |
| 8,606,846 B2 | 12/2013 | Czechowski, III et al. |
| 8,688,907 B2 * | 4/2014 | Grube ................. G06F 11/1088 |
| | | 714/48 |

(Continued)

FOREIGN PATENT DOCUMENTS

| CA | 2573214 C | 6/2013 |
| CN | 101448139 | 6/2009 |

(Continued)

*Primary Examiner* — Brian R Peugh

(57) ABSTRACT

Method and device for downloading resources, applicable to a peer to peer (P2P) network. The method includes: initiating a downloading task according to a downloading request from a resource requester; acquiring data of the downloading task and writing the data of the downloading task to a memory; and reading the data from the memory and providing the data to the resource requester. The present invention can reduce the amount of magnetic disk consumption due to resource downloading.

20 Claims, 5 Drawing Sheets

(56) References Cited

U.S. PATENT DOCUMENTS

| | | | |
|---|---|---|---|
| 10,291,735 B2* | 5/2019 | Coglitore | ............... H04L 67/26 |
| 2009/0100128 A1 | 4/2009 | Czechowski, III et al. | |
| 2014/0082125 A1 | 3/2014 | Van Coppenolle et al. | |
| 2017/0149859 A1 | 5/2017 | Chen | |
| 2018/0034894 A1* | 2/2018 | Jin | .......................... H04W 8/24 |

FOREIGN PATENT DOCUMENTS

| | | |
|---|---|---|
| CN | 102065146 | 5/2011 |
| CN | 102355495 | 2/2012 |
| CN | 105450738 B | 2/2019 |
| WO | 2008017502 A1 | 2/2008 |
| WO | 2014114985 | 7/2014 |

\* cited by examiner

METHOD AND DEVICE FOR DOWNLOADING RESOURCES

The present application claims priority to China Patent Application No. 201711406746.2 filed on Dec. 22, 2017 and entitled "METHOD AND DEVICE FOR DOWNLOADING RESOURCES," corresponding to PCT Patent Application No. PCT/CN2018/121445 filed Dec. 17, 2018 which are incorporated herein by reference in their entirety.

TECHNICAL FIELD

The present invention relates to peer to peer (P2P) network technology and in particular to a method and a device for downloading resources.

BACKGROUND

In the prior art, a P2P node directly writes data of a resource to a magnetic disk when downloading the resource. When a resource is downloaded in this manner, even scattered and fragmented data is written directly to a magnetic disk. Therefore, data of the resource often needs be written to and read from the magnetic disk repeatedly, not only causing great consumption to the magnetic disk, but also leading to low utilization of the magnetic disk.

However, among all kinds of nodes of a P2P network, many have a poor storage capacity, such as a mobile terminal and an OTT terminal. Magnetic disks of these P2P nodes have disadvantages such as slow read and write, a small storage capacity, and a limited number of reads and writes, and too many writes will lead to bad blocks and even bad cards. Life of a magnetic disk of such a P2P node will definitely be reduced to a large extent if data is written to the magnetic disk no matter whether the downloading task is complete.

In summary, for P2P nodes with a poor storage capacity, how to reduce magnetic disk consumption in the process of downloading a resource is an urgent technical problem to be solved.

SUMMARY

The present invention addresses several technical issues in the related art.
In embodiments, the present invention provides for a method and a device for downloading resources, and is capable of reducing the amount of magnetic disk consumption resulting from resource downloading. The present invention utilizes a technical scheme as follows A method for downloading resources, applied to a peer to peer (P2P) network, comprising: initiating a downloading task according to a downloading request from a resource requester; acquiring data of the downloading task and writing the data of the downloading task to a memory; and reading the data from the memory and providing the data to the resource requester.

The method further comprises: determining whether the downloading task is complete when data in the memory reaches a preset upper limit of use, wherein the downloading task being complete indicates that a complete resource is able to be acquired by the downloading task; and filtering out the downloading task when the downloading task is incomplete so that the data in the memory will not be written to a magnetic disk.

The method further comprises: determining whether the downloading task is complete when data in the memory reaches a preset upper limit of use, wherein the downloading task being complete indicates that a complete resource is able to be acquired by the downloading task; and writing the data in the memory to a magnetic disk when it is determined that the downloading task is complete.

The method further comprises: determining whether the downloading task is complete according to Range information in the downloading request.

The method further comprises one or two of the following: determining whether the Range information in the downloading request starts from 0, and determining that the downloading task is complete if the Range information starts from 0; and identifying, according to the Range information in the downloading request, whether the downloading request corresponds to seek operation, and determining that the downloading task is incomplete if the downloading request corresponds to Seek operation.

The identifying, according to the Range information in the downloading request, whether the downloading request corresponds to Seek operation comprises: determining, according to the Range information in the downloading request and Range information of a corresponding downloading task already existing in the memory, whether data corresponding to the downloading request is able to be spliced into a complete resource with corresponding data already existing in the memory; and determining, if the data corresponding to the downloading request is able to be spliced into a complete resource with the corresponding data already existing in the memory, that the downloading request does not correspond to Seek operation.

The writing the data in the memory to a magnetic disk comprises:
when the data in the memory reaches the preset upper limit of use and the downloading task is complete, creating a file in the magnetic disk and writing the data in the memory to the file, or directly opening a file corresponding to the downloading task and writing the data in the memory to the opened file.

The writing the data in the memory to a magnetic disk comprises splicing the data in the memory into a continuous data block and writing the data block to the magnetic disk.

The method further comprises: when the data in the memory reaches the preset upper limit of use and the downloading task is complete, analyzing the free space of the magnetic disk; and if the free space of the magnetic disk is not sufficient to store the data in the memory, performing an elimination operation on resources so as to write the data in the memory to the magnetic disk.

The acquiring data of the downloading task and writing the data of the downloading task to a memory comprises: initially allocating one or a plurality of fixed-sized memory blocks to the downloading task, and writing the data of the downloading task to the memory through recycling of the memory block(s).

The acquiring data of the downloading task and writing the data of the downloading task to a memory comprises: initially allocating one or a plurality of fixed-sized memory blocks to the downloading task; writing the data of the downloading task to the memory block(s) upon receipt of the data; when the memory block(s) is/are full, releasing part or all of the memory block(s) for use by subsequent data received; and repeating such an operation until the downloading task is completed.

After the data in the memory is written to the magnetic disk, a memory block occupied by the data in the memory is released.

After the data is read from the memory and provided to the resource requester, a memory block occupied by the data in the memory is released.

The filtering out the downloading task when the downloading task is incomplete comprises: setting a downloading mode of the downloading task as a memory mode when the downloading task is incomplete, wherein the data in the memory will not be written to the magnetic disk in the memory mode; and the writing the data in the memory to a magnetic disk when the downloading task is complete comprises: setting a downloading mode of the downloading task as a mode of magnetic disk+memory when the downloading task is complete, wherein the data in the memory will be written to the magnetic disk in the mode of magnetic disk+memory.

The downloading mode of the downloading task is set by resetting a downloading mode parameter of the downloading task.

In an embodiment, a device for downloading resources, applied to a peer to peer (P2P) network, comprises:

an initiating module for initiating a downloading task according to a downloading request from a resource requester; an acquisition module for acquiring data of the downloading task; a memory module for writing the data of the downloading task to a memory; and a providing module for reading the data from the memory and providing the data to the resource requester.

The device further comprises: a determining module for determining whether the downloading task is complete when data in the memory reaches a preset upper limit of use, wherein the downloading task being complete indicates that a complete resource is able to be acquired by the downloading task; a filtering module for filtering out the downloading task when the downloading task is incomplete so that the data in the memory will not be written to a magnetic disk; and a magnetic-disk writing module for writing the data in the memory to a magnetic disk when it is determined that the downloading task is complete.

The determining module in an embodiment is configured to determine whether the downloading task is complete according to Range information in the downloading request.

The determining module in an embodiment is configured to determine whether the downloading task is complete by one or two of the following ways:

determining whether the Range information in the downloading request starts from 0, and determining that the downloading task is complete if the Range information starts from 0; and identifying, according to the Range information in the downloading request, whether the downloading request corresponds to Seek operation, and determining that the downloading task is incomplete if the downloading request corresponds to Seek operation.

The magnetic-disk writing module in an embodiment is configured to: when the data in the memory reaches the preset upper limit of use and the downloading task is complete, create a file in the magnetic disk and write the data in the memory to the file, or directly open a file corresponding to the downloading task and write the data in the memory to the opened file.

The magnetic-disk writing module in an embodiment is specifically configured to splice the data in the memory into a continuous data block and write the data block to the magnetic disk.

The memory module is configured to write the data of the downloading task to a memory, comprising: initially allocating one or a plurality of fixed-sized memory blocks to the downloading task, and writing the data of the downloading task to the memory through recycling of the memory block(s).

The memory module in an embodiment is configured to write the data of the downloading task to a memory, comprising: initially allocating one or a plurality of fixed-sized memory blocks to the downloading task; writing data currently received by the acquisition module to the memory block(s); when the memory block(s) is/are full, releasing part or all of the memory block(s) for use by subsequent data received by the acquisition module; and repeating such an operation until the downloading task is completed.

A device for downloading resources in an embodiment comprises:

a storage storing a computer program; and a processor configured to read the computer program so as to perform the above method for downloading resources.

The present invention includes the following advantages.

In one aspect, in the present invention, by putting received data into a memory first and then directly providing the data in the memory to a resource requester, time-consuming steps, such as analyzing the free space of a magnetic disk, eliminating resources, and creating files, can be avoided so as to improve the speed of resource returning, thereby significantly reducing the first-frame time and improving the user experience. In addition, by putting data into a memory, the number of writes to a magnetic disk can also be reduced, thereby decreasing the magnetic disk consumption and extending the magnetic disk life.

In another aspect, by the present invention, the operation of writing data to a magnetic disk (for example, the operation of creating a file) can be triggered only when data in the memory reaches a preset upper limit of use, and thus the number of writes to the magnetic disk is further reduced, thereby decreasing the magnetic disk consumption and extending the magnetic disk life.

In still another aspect, in the present invention, a data block with high completeness is written to a magnetic disk all at once when data in the memory reaches a preset upper limit of use, allowing fewer writes to the magnetic disk, higher completeness of buffered resources in the magnetic disk, and higher utilization of the magnetic disk space.

In yet another aspect, in the present invention, the operation of writing data to a magnetic disk can be triggered only when data in the memory reaches a preset upper limit of use, so time-consuming steps, such as analyzing the free space of a magnetic disk, eliminating resources, and creating files, can be delayed, thereby significantly reducing the first-frame time and improving the user experience.

A product implementing the present invention does not necessarily need to achieve all of the advantages described above at the same time.

DETAILED DESCRIPTION

Figure 1:
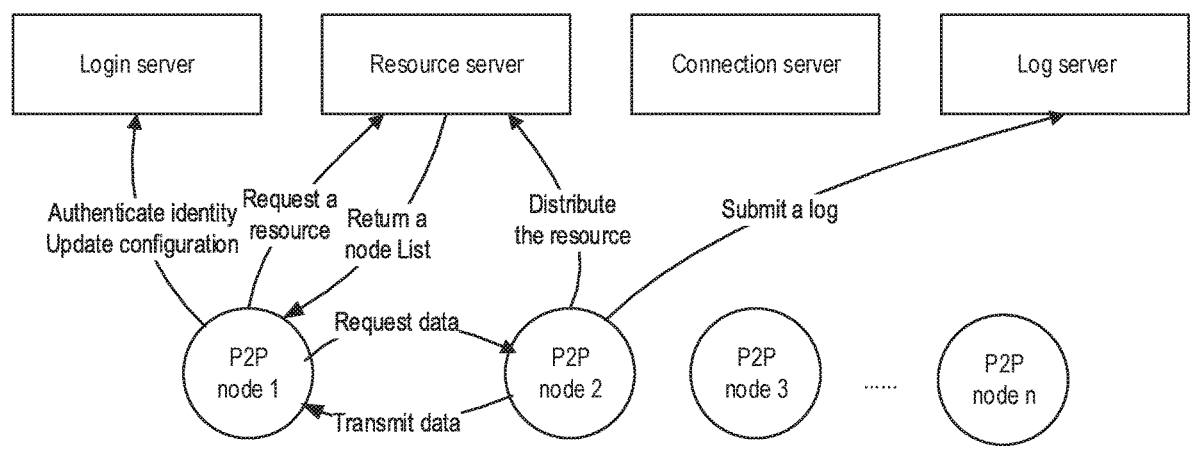
FIG. 1 is a schematic diagram of a network architecture in an exemplary application environment of the present invention.

Aspects of the present invention are described in more detail below with reference to the accompanying drawings and embodiments.

It is noted that embodiments of the present invention and each feature of embodiments may be combined with one another, all falling within the protected scope of the present claims. Additionally, although a logical sequence is shown in the flowchart, in some cases, the illustrated or described steps can be performed in an order different from that described herein.

In a typical configuration, a computing device of a client or a server can include one or a plurality of processors (CPUs), input/output interfaces, a network interface, and a memory.

The memory may include a computer-readable medium in the form of a non-permanent memory, a random-access memory (RAM), a non-volatile memory, and/or the like, such as a read-only memory (ROM) or a flash memory (flash RAM). The memory is an example of the computer-readable medium. The memory can include a module 1, a module 2, ... a module N (N is an integer greater than 2).

The computer-readable medium includes permanent and non-permanent storage media and removable and non-removable storage media. The storage medium can implement the information storage by means of any method or technique. The information may be a computer-readable instruction, a data structure, a module of a program, or other data. Examples of the storage medium of a computer include, but are not limited to, a phase change memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a compact disk read-only memory (CD-ROM), a digital versatile disc (DVD) or other optical storages, a cassette tape, a magnetic tape/magnetic disk storage or other magnetic storage devices, or any other non-transmission medium, and can be used for storing information accessible by a computing device. According to the definitions herein, the computer-readable medium does not include non-transitory computer-readable media, such as a modulated data signal and a carrier wave.

The P2P nodes described in the present invention can be any device capable of implementing the functions of the P2P nodes. The device can be a PC terminal, an Over The Top (OTT) terminal, an Android terminal, or other system terminals. In other words, the computing device can be, but is not limited to, an OTT device, a mobile terminal, a tablet computer, a mobile Internet device, and a wearable device that provide a user with various application services via the Internet, or other hardware entities or virtual devices on which a P2P program can be deployed.

The resource requester described in the present application can be a hardware entity or a virtual device capable of acquiring a resource via an accelerator. The resource requester can be, but is not limited to, an application integrated with an accelerator, for example, a player acquiring a video file via an accelerator.

Terms involved herein are explained as follows.

"P2P" refers to a distributed application architecture allocating tasks and workloads among peers, and is a networking or network type formed by a peer-to-peer computing model at an application layer.

"P2P node" refers to each terminal in a P2P network system.

"Accelerator" refers to a P2P program running on a P2P node, and the P2P program can be a dynamic or static library integrated in an application, such as a software development kit (SDK) integrated in Youku App on a mobile phone, IKU client on a PC, etc. The P2P program can also be an independent executable program.

"P2P node downloading resources" refers to a P2P node provided with an accelerator for downloading resources.

"P2P node uploading resources" refers to a P2P node provided with an accelerator for uploading resources.

"First-frame time" refers to the elapsed time from receiving a request from a player to returning the first frame of video data.

FIG. 1 shows an exemplary application environment architecture for the technical scheme of the present application. A P2P network includes n (n is an integer not less than 1) P2P nodes, including a P2P node 1, a P2P node 2, a P2P node 3, ... a P2P node n. The P2P node 2, as a P2P node uploading resources, can distribute a resource to a resource server so that other P2P nodes can download the resource from the resource server, and can submit a log to a log server so that the P2P node 2 can be regularly maintained. The P2P node 1, as a P2P node downloading resources, can perform processing such as identity authentication and configuration updating through a login server, and can also acquire, by requesting resources from the resource server, a node list of P2P nodes uploading resources. In an example shown in FIG. 1, the P2P node 1 selects the P2P node 1 from the node list to download a resource, and then the P2P node 1 completes the downloading of the resource by requesting data from the P2P node 2 and receiving data transmitted by the P2P node 2. In FIG. 1, a connection server is responsible for communication connections among P2P nodes in a P2P network.

In the related art, among all kinds of terminal nodes in a P2P network, many have a poor storage capacity, such as a mobile terminal and an OTT terminal. These nodes have disadvantages such as slow read and write, a small storage capacity, and a limited number of reads and writes, and too many writes will lead to bad blocks and even bad cards, thereby reducing the life of a tf card and compromising the stability of a system. Therefore, some filtering is required to be performed on resources to be written, that is, detected incomplete videos are filtered out in advance rather than being written to a magnetic disk, thus reducing the magnetic disk consumption and the magnetic disk space occupied by these incomplete videos.

In addition, video display experience has an extremely important indicator, first-frame time, that is, time consumed to acquire the first frame of video data. The video display experience may be compromised if an accelerator performs too many steps and spends too much time in downloading data. Moreover, in the downloading process by an accelerator, it is relatively time-consuming to calculate the free space of a magnetic disk, eliminate resources, and create files, especially in some tf cards with poor performance. Therefore, improving the first-frame time requires some optimization of current resource storage steps.

In summary, the following aspects need to be considered when storing a resource: designing a good storage policy, ensuring the completeness of local resources, improving the utilization of the magnetic disk space, and reducing the first-frame time.

At present, a P2P node directly writes a resource to a magnetic disk after downloading the resource. Generally speaking, a resource storage scheme of writing a resource directly to a magnetic disk is a sequential storage method, i.e., opening a file→receiving data→writing the data in→closing the file. That is, the resource storage scheme is: first, obtaining a file size of a resource from a server (for example, a resource server) or a CDN before downloading data; then, determining whether the current free space of a magnetic disk is sufficient according to the file size and, if not, eliminating resources until the free space is sufficient for storage; next, creating a resource file on the magnetic disk and opening the file, and upon receipt of the downloaded data, writing the data to the magnetic disk through an opened file handle; and finally, closing the file after the data has been completely received.

The above scheme is not optimal in terms of performance. Firstly, a file needs to be created regardless of whether a downloading task is complete (namely, whether the downloading task can download a complete resource, such as a complete video file). An entire file has to be created even if a play request happens to be the last 1 KB of data. In this way, an incomplete video file will be written to a magnetic disk, causing both magnetic disk consumption and low magnetic disk utilization. Secondly, in the whole process of downloading a resource, it is relatively time-consuming to analyze the free space of a magnetic disk, eliminate resources, and create files, especially time-consuming in an SD card with poor read and write performance, taking a few hundred milliseconds or so, which will significantly compromise the first-frame time for playing a video.

Thus, at least one or more of the following technical problems exist in the related art: 1) frequently writing to a magnetic disk causes so much consumption to the magnetic disk that the life of the magnetic disk will be reduced; 2) lots of incomplete resources will be buffered in a magnetic disk, resulting in low utilization of the magnetic disk space; and 3) the need for performing time-consuming processes before storing a resource, such as analyzing the free space of a magnetic disk, eliminating resources, and creating files, results in a long downloading process and failure to return the resource to a player in time, thereby extending the first-frame time. For the above technical problems, the present invention proposes the following technical scheme that can achieve at least one of the following effects by delaying writing to a magnetic disk: 1) reducing the number of writes to a magnetic disk and avoiding frequent writes to the magnetic disk for the purpose of effectively extending the magnetic disk life; 2) enhancing the completeness of resources buffered in a magnetic disk and improving utilization of the magnetic disk space; and 3) delaying the execution of time-consuming steps, such as analyzing the free space of a magnetic disk, eliminating resources, and creating files, for the purpose of significantly reducing the first-frame time and improving the user experience.

The technical scheme of the present invention is explained in detail below.

Embodiment 1

Figure 2:
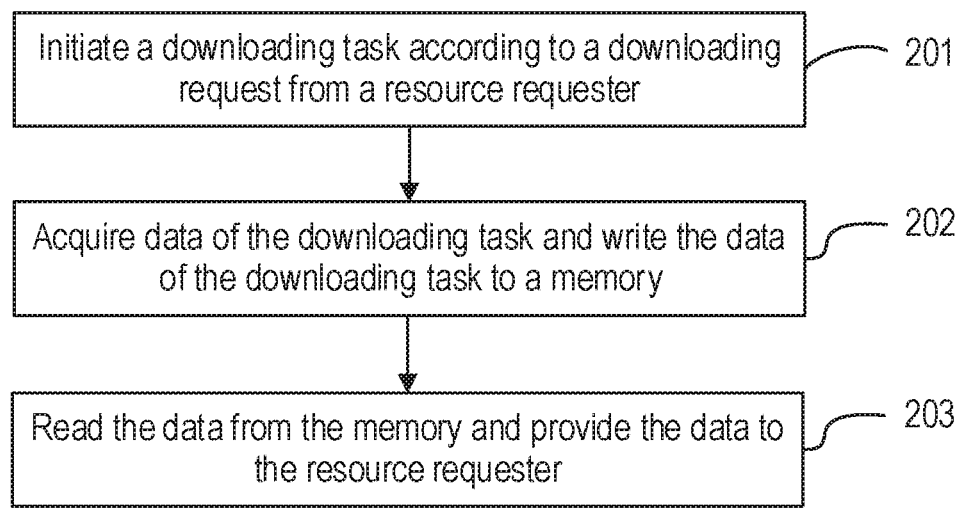
FIG. 2 is a schematic flowchart of a method for downloading resources in Embodiment 1.

A method for downloading resources, applied to a P2P network. As shown in FIG. 2, the method includes:
step 201: initiating a downloading task according to a downloading request from a resource requester;
step 202: acquiring data of the downloading task and writing the data of the downloading task to a memory; and
step 203: reading the data from the memory and providing the data to the resource requester.

In this embodiment, in the process of downloading resources, the received data is put into a memory first; data in the memory is directly provided to a resource requester; the first-frame data is directly read from the memory; thus, time-consuming steps, such as analyzing the free space of a magnetic disk, eliminating resources, and creating files, are avoided, thereby reducing the first-frame time and improving the user experience. In addition, by putting data into a memory, the number of writes to a magnetic disk can also be reduced, thereby decreasing the magnetic disk consumption and extending the magnetic disk life.

In a practical application, one resource corresponds to one downloading task; each resource has a unique resource ID; a downloading task is associated with a resource through the resource ID. A resource ID is carried in a downloading request provided by a resource requester and an accelerator can initiate a corresponding downloading task according to the resource ID.

The memory described in this embodiment is not a real-time system memory but a memory allocated to a downloading task. Different downloading tasks are independent of each other and each downloading task manages its own memory. In order not to affect the normal use of an application, an upper limit of use of memory is preset for an accelerator. The upper limit of use of memory is preset in units of tasks, that is, the upper limit of use of memory refers to an upper limit for scheduling the memory for each task of the accelerator. In this embodiment, "memory is full" means that memory data for one downloading task reaches the above upper limit of use of memory. For example, if an upper limit of use of memory for an accelerator is preset as 2 MB, it means that each task of the accelerator (for example, one downloading task) has 2 MB memory for scheduling, and the memory for a downloading task being full means that the memory currently used for the downloading task has reached 2 MB.

In terms of memory use, in this embodiment, data of a downloading task is written to a memory by recycling of memory blocks, to control the size of the memory, reduce the allocation and release of the memory, and improve the efficiency in using the memory. That is, in this embodiment, the writing the data of the downloading task to a memory can include: initially allocating one or a plurality of fixed-sized memory blocks to the downloading task, and writing the data of the downloading task to the memory through recycling of the memory block(s). In particular, the acquiring data of the downloading task and writing the data of the downloading task to a memory can include: initially allocating one or a plurality of fixed-sized memory blocks to the downloading task; writing the data of the downloading task to the memory block(s) upon receipt of the data; when the memory block(s) is/are full, releasing part or all of the memory block(s) for use by subsequent data received; and repeating such an operation until the downloading task is completed.

In a practical application, writing data of a downloading task to a memory by means of recycling the memory block(s) can include: initially allocating fixed-size memory block(s), with an initial state of the memory block(s) being set as "free"; writing data to the "free" memory block(s) upon receipt of the data and identifying the memory block(s) as "in use" after the data has been written to the memory block(s); reading data in all or part of the full memory block(s) when the memory block(s) is/are full and resetting the state of the memory block(s) as "free" for use by the newly received data, so that data of the current downloading task can be stored by recycling of memory block(s) initially allocated to the current downloading task, thus avoiding frequent allocation and releasing of memory for the current downloading task; and finally, when the entire downloading task is completed, reading data in the memory block(s) (e.g., writing the data to a magnetic disk and/or outputting the data to a resource requester) and releasing the memory block(s) for subsequent use.

Here, the currently received data can be directly written to the free memory block(s) if the free memory block(s) is/are sufficient to store the currently received data; all or part of the full memory block(s) will be released (that is, data in the memory block(s) can be read, and then written to a magnetic disk or directly returned to a resource request) and the currently received data will be stored in the released memory block(s) if all the memory blocks are full or the current free memory block(s) is/are not sufficient to store the currently received data.

For example, for 4 memory blocks initially allocated, each having a size of 1 MB, when four pieces of data, such as 0 MB to 1st MB, 1st MB to 2nd MB, 2nd MB to 3rd MB, and 3rd MB to 4th MB, are received, memory blocks 1, 2, 3, and 4 are created for storing the data, and a bitmap data structure is used for recording the use of data in each memory block at the same time. When it is found that the memory for the current downloading task has reached a preset upper limit of use upon receipt of data of the 5th MB, according to data in a bitmap, data in memory block(s) already used is read and written to a magnetic disk or returned to a resource requester, so that the memory block(s) is/are released to store the data of the 5th MB. Similarly, when further data is received, data in the full memory block(s) is read in turn (written to a magnetic disk and/or returned to a resource requester), and the currently received data is put into the released memory block(s); information recorded in a corresponding bitmap is updated at the same time.

In this embodiment, after the data is read from the memory and provided to the resource requester, a memory block occupied by the data in the memory is released.

In this embodiment, after data in the memory is written to a magnetic disk, a memory block occupied by the data in the memory is released.

In this embodiment, during the downloading process, the received data is not directly written to a magnetic disk, but is stored in a memory and written to the magnetic disk with delay. The operation of writing data to a magnetic disk is triggered when the memory for the downloading task is full.

In one implementation, the method can further include: determining whether the downloading task is complete when data in the memory reaches a preset upper limit of use, where the downloading task being complete indicates that a complete resource is able to be acquired by the downloading task, and filtering out the downloading task when the downloading task is incomplete so that the data in the memory will not be written to a magnetic disk.

In one implementation, the method can further include: determining whether the downloading task is complete when data in the memory reaches a preset upper limit of use, where the downloading task being complete indicates that a complete resource is able to be acquired by the downloading task, and writing the data in the memory to a magnetic disk when it is determined that the downloading task is complete.

In the above implementations of this embodiment, the determination of which downloading tasks are incomplete is triggered when a memory for a downloading task is full of data. A resource downloaded for an incomplete downloading task will not be available for distribution, so that such an incomplete downloading task is filtered out rather than being written to a magnetic disk, while data for a complete downloading task is written to a magnetic disk. In this way, filtering out incomplete downloading tasks and only writing data of complete downloading tasks to a magnetic disk can avoid waste of the magnetic disk space and improve utilization of the magnetic disk space.

In this embodiment, the downloading task is filtered by setting a downloading mode of the downloading task. In one implementation, the filtering out the downloading task when the downloading task is incomplete so that the data in the memory will not be written to a magnetic disk can include: setting a downloading mode of the downloading task as a memory mode when the downloading task is incomplete, where the data in the memory will not be written to the magnetic disk in the memory mode. In another implementation, the writing the data in the memory to a magnetic disk when the downloading task is complete can include: setting a downloading mode of the downloading task as a mode of magnetic disk+memory when the downloading task is complete, where the data in the memory will be written to the magnetic disk in the mode of magnetic disk+memory.

The magnetic disk is not written to in the memory mode and is written to in the mode of "magnetic disk+memory." In a practical application, a main purpose of writing to a magnetic disk is to distribute a resource to other P2P nodes, provided that the resource is complete. An incomplete resource is not available for distribution as the correctness of data cannot be determined due to incompleteness. The downloading tasks filtered out herein are primarily ones for incomplete resources not available for distribution.

In one implementation, data of a downloading task resides in a memory block in the memory mode. Data in the memory is erased after data in the memory block has been transmitted to a resource requester, and the memory is free for use by new data after data in the entire memory block has been erased.

In another implementation, data of the downloading task is first stored in a memory block in the mode of "magnetic disk+memory." When a memory block is full of data, data in the memory block is written to a magnetic disk. Data in the memory block is erased after being written to the magnetic disk. The memory is free for use by new data after data in the entire memory block has been erased.

In this embodiment, a downloading mode of the downloading task can be set by resetting a downloading mode parameter of the downloading task after it is determined whether the downloading task is complete.

For example, one downloading mode parameter can be set for each downloading task, and the downloading mode parameter can indicate the above two downloading modes. For example, a downloading mode parameter set to be "1" indicates that the downloading mode is set as the memory mode, and a downloading mode parameter set to be "2" indicates that the downloading mode is set as the mode of "magnetic disk+memory." In addition, other means can also be employed, which are not limited herein.

For example, a downloading mode parameter can be set as the one indicating the mode of "magnetic disk+memory" at the beginning of a downloading task and, after it has been determined that the downloading task is incomplete, the downloading mode parameter of the downloading task is reset as the one indicating the memory mode. In this way, during the execution of the downloading task, the received data is put into the memory, but data in the memory will not be written to a magnetic disk. Initial setting of the downloading mode parameter for a downloading task is maintained after it has been determined that the downloading task is complete. In this way, during the execution of the downloading task, the received data in the mode of "magnetic disk+memory" is put into the memory and will be written to a magnetic disk.

It is noted that the completeness of a downloading task in this embodiment refers to the completeness of a resource that can be acquired by the downloading task. The downloading task being complete indicates that a complete resource can be acquired by the downloading task, and the downloading task being incomplete indicates that a complete resource cannot be acquired by the downloading task. Here, the resource refers to a file that can be independently downloaded, and the complete resource refers to the complete file that can be independently downloaded, i.e., all the data of the file. Here, the file can be any type of file. For example, the file can be a video file. For example, some video files are so large that the video files will be split into a plurality of small files generally of tens of MB on a server. Each small file can be downloaded as an independent task unit. One small file is one resource, and one complete resource can be all data in one small file.

In this embodiment, whether the downloading task is complete can be determined in a plurality of ways. In one implementation, the method described above can include determining whether the downloading task is complete according to Range information in the downloading request.

In a practical application, the Range information can be acquired by parsing the downloading request. For example, when a user clicks to play a video in an application, a URL address of the video source and corresponding Range information are transmitted by a player to an accelerator, which is a downloading request received by the accelerator. Range information is parsed through a standard HTTP protocol. A Content-Range field can be acquired by parsing a header of a downloading request and Range information can be extracted from the Content-Range field.

At present, it can be determined that a resource is definitely incomplete in two cases. The first case: Range information acquired by parsing a downloading request does not start from 0, indicating that a resource to be downloaded does not start from the beginning and data acquired thereafter will definitely not form a complete resource. Correspondingly, the current downloading task is incomplete if Range information acquired by parsing a downloading request does not start from 0. For example, Range information of a video played in sequence starts from 0. In most cases, Range information does not start from 0, definitely leading to an incomplete downloaded resource. For example, Range information does not start from 0 in the following three cases: A) Seek; B) skipping the credit titles; C) recording the last viewed position for the continuation of viewing, and so on.

The second case: in a practical application, a middle section of data is skipped when a user performs Seek operation, causing the entire file to be incomplete. A current resource to be downloaded is incomplete if intra-file Seek is identified according to a downloading request and, correspondingly, the current downloading task is incomplete if intra-file Seek is identified. Here, the intra-file Seek refers to Seek in an independent file.

In the first case described above, it can be determined whether a downloading task is complete when the downloading task is initiated. In the second case, a downloading task can be considered incomplete once Seek operation has been identified during a period from initiating the downloading task to the memory being full.

Based on the above two cases, in this embodiment, whether a downloading task is complete can be determined by the following two ways: 1) determining whether Range information in the downloading request starts from 0, and determining that the downloading task is complete if the Range information starts from 0, and determining that the downloading task is incomplete if the Range information does not start from 0; and 2) identifying, according to Range information in the downloading request, whether the downloading request corresponds to Seek operation, and determining that the downloading task is incomplete if the downloading request corresponds to Seek operation. It is necessary to determine whether the downloading task is complete in combination with Range information if the downloading request does not correspond to Seek operation. In other words, a corresponding downloading task is definitely incomplete if the downloading request corresponds to Seek operation, and a corresponding downloading task is not necessarily complete if the downloading request does not correspond to Seek operation. In a practical application, a memory for a downloading task, with a size of a few MB, needs a few seconds to be full of data, and allows the identification of some quick Seek scenarios.

Specifically, the identifying, according to the Range information in the downloading request, whether the downloading request corresponds to Seek operation can include: determining, according to the Range information in the downloading request and Range information of a corresponding downloading task already existing in the memory, whether data corresponding to the downloading request is able be spliced into a complete resource with corresponding data already existing in the memory; and determining, if data corresponding to the downloading request is able to be spliced into a complete resource with the corresponding data already existing in the memory, that the downloading request does not correspond to Seek operation. Here, if data corresponding to the downloading request is not able be spliced into a complete resource with the corresponding data already existing in the memory, then it is determined that the downloading request corresponds to Seek operation. In addition, whether the current downloading request corresponds to Seek operation can also be identified by other means, which are not limited herein.

In this embodiment, the received data is first put into a memory and written to a magnetic disk with delay. Specifically, the writing the data in the memory to a magnetic disk can include: when the data in the memory reaches the preset upper limit of use and the downloading task is complete, creating a file in the magnetic disk and writing the data in the memory to the file, or directly opening a file corresponding to the downloading task and writing the data in the memory to the opened file. In other words, in this embodiment, when data in the memory is written to a magnetic disk, a file is created in conditions that the memory is full and the downloading task is complete. In this way, writes to a magnetic disk, such as file creation and file opening, are delayed and triggered when a corresponding memory is full, thereby effectively reducing the first-frame time.

In this embodiment, the process of writing data in a memory to a magnetic disk can include: determining whether a file corresponding to the current downloading task already exists (for example, determining whether a file corresponding to the downloading task already exists according to a resource ID of the downloading task and a resource ID of the file); if no file corresponding to the current downloading task exists, first creating a file in the magnetic disk, then opening the file and writing data in the memory to the file through an opened file handle, and closing the file after data in the memory has been completely written; and if a file corresponding to the current downloading task exists, directly opening the file and writing data in the memory to the file through an opened file handle, and then closing the file after data in the memory has been completely written.

In a practical application, a buffer path can be obtained from an initiating parameter when an accelerator has just been initiated. When the file creation operation is triggered, according to a resource ID of a downloading task, the buffer path is searched to find out whether a file named after the resource ID exists; and if so, the file is opened, and if not, a file named after the resource ID is created. For example, a resource ID is 53121400C244D5B00B87A39 D804438 FA5FC575A3, and the name of a file created can be 53121400C244D5B00B87A39D804438FA5FC575A step 3.dat.

In this embodiment, the writing of the data in the memory to a magnetic disk can include: splicing the data in the memory into a continuous data block and writing the data block to the magnetic disk. Therefore, scattered and fragmented data from a plurality of P2P nodes uploading resources is stored in the memory first, and then written to a magnetic disk all at once after being spliced into a continuous and complete data block, thereby improving the writing efficiency, reducing the number of writes to a magnetic disk, and enhancing the 10 performance of a magnetic disk.

In this embodiment, the method further includes: when the data in the memory reaches the preset upper limit of use and the downloading task is complete, analyzing the free space of the magnetic disk; and if the free space of the magnetic disk is not sufficient to store the data in the memory, performing an elimination operation on resources so as to write the data in the memory to the magnetic disk. In this manner, time-consuming steps for magnetic disk processing, such as analyzing the magnetic disk space and eliminating resources, can be delayed and triggered when a corresponding memory is full. The delay of such part of time consumption avoids the impacts of these steps on the first-frame data.

Embodiment 2

Figure 3:
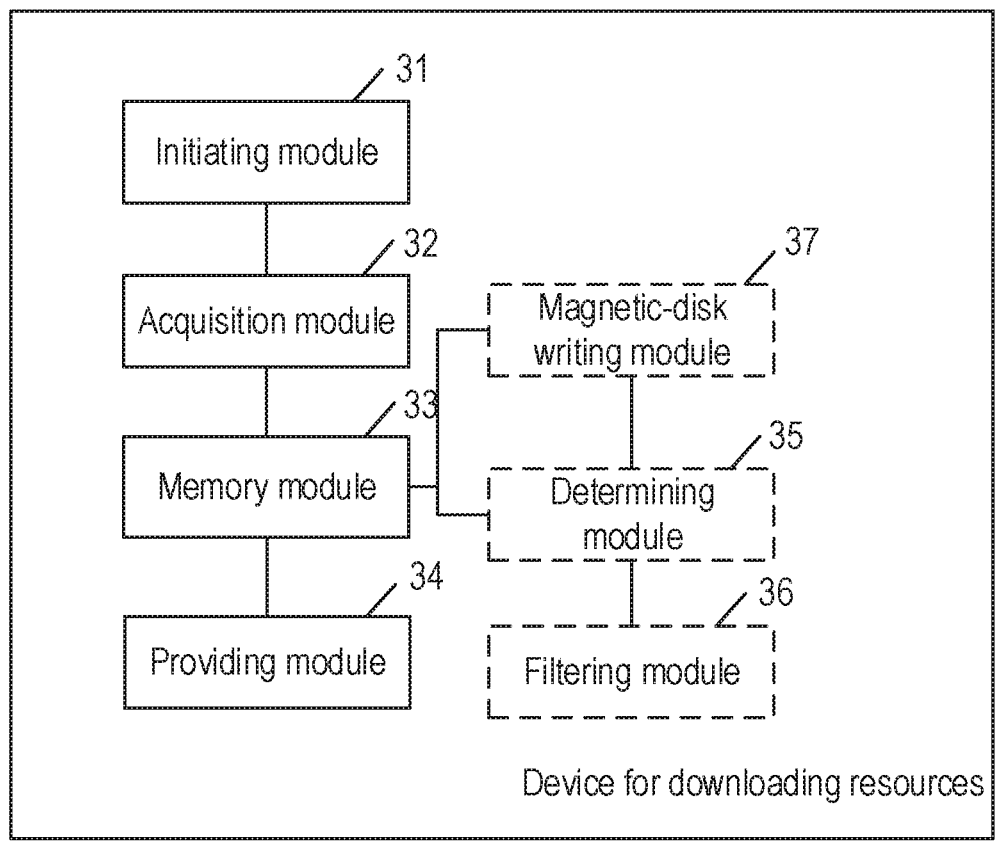
FIG. 3 is a schematic structural diagram of a device for downloading resources in Embodiment 2.

This embodiment also provides a device for downloading resources, applied to a P2P network. As shown in FIG. 3, the device may include:

an initiating module 31 for initiating a downloading task according to a downloading request from a resource requester;

an acquisition module 32 for acquiring data of the downloading task;

a memory module 33 for writing the data of the downloading task to a memory; and a providing module 34 for reading the data from the memory and providing the data to the resource requester.

In this embodiment, the device described above can further include:

a determining module 35 for determining whether the downloading task is complete when data in the memory reaches a preset upper limit of use, where the downloading task being complete indicates that a complete resource is able to be acquired by the downloading task;

a filtering module 36 for filtering out the downloading task when the downloading task is incomplete so that the data in the memory will not be written to a magnetic disk; and a magnetic-disk writing module 37 for writing the data in the memory to a magnetic disk when it is determined that the downloading task is complete.

In one implementation, the determining module 35 can be specifically configured to determine whether the downloading task is complete according to Range information in the downloading request.

In one implementation, the determining module 35 can be specifically configured to determine whether the downloading task is complete by one or two of the following ways: 1) determining whether the Range information in the downloading request starts from 0, and determining that the downloading task is complete if the Range information starts from 0; and 2) identifying, according to the Range information in the downloading request, whether the downloading request corresponds to Seek operation, and determining that the downloading task is incomplete if the downloading request corresponds to Seek operation.

In one implementation, the magnetic-disk writing module 37 can be specifically configured to: when the data in the memory reaches the preset upper limit of use and the downloading task is complete, create a file in the magnetic disk and write the data in the memory to the file, or directly open a file corresponding to the downloading task and write the data in the memory to the opened file.

In one implementation, the magnetic-disk writing module 37 can be specifically configured to splice the data in the memory into a continuous data block and write the data block to the magnetic disk.

In one implementation, the memory module 33 can be configured to write the data of the downloading task to a memory, including: initially allocating one or a plurality of fixed-sized memory blocks to the downloading task, and writing the data of the downloading task to the memory through recycling of the memory block(s).

In one implementation, the memory module 33 can be configured to write the data of the downloading task to a memory, including: initially allocating one or a plurality of fixed-sized memory blocks to the downloading task; writing data currently received by the acquisition module to the memory block(s); when the memory block(s) is/are full, releasing part or all of the memory block(s) for use by subsequent data received by the acquisition module; and repeating such an operation until the downloading task is completed.

In a practical application, the above device of this embodiment can be disposed on or implemented as a P2P node.

It is noted that in the above device of this embodiment:
the initiating module 31, responsible for managing downloading tasks, can initiate a corresponding downloading task according to a resource ID carried in a downloading request, and can be software, hardware, or a combination of both in a practical application;

the acquisition module 32, responsible for acquiring data of an initiated downloading task from a P2P node uploading resources, can acquire data of a corresponding resource according to a resource ID of a downloading task, and can be software, hardware, or a combination of both in a practical application;

the memory module 33 is responsible for managing the memory for each downloading task, including: allocating a memory to a downloading task, and writing data of a downloading task to a corresponding memory; and can be software, hardware, or a combination of both in a practical application;

the providing module 34, responsible for providing data to the resource requester, can read data from a memory and transmit the data to a resource requester, and can be software, hardware, or a combination of both in a practical application;

the determining module 35 is responsible for determining whether the downloading task is complete, i.e., whether a complete resource can be acquired by the downloading task, and can be software, hardware, or a combination of both in a practical application;

the filtering module 36 is responsible for filtering out the incomplete downloading tasks so that data of these downloading tasks will not be written to a magnetic disk, and can be software, hardware, or a combination of both in a practical application; and the magnetic-disk writing module 37 is responsible for writing data of the complete downloading tasks to a magnetic disk, and can be software, hardware, or a combination of both in a practical application.

Embodiment 3

Figure 4:
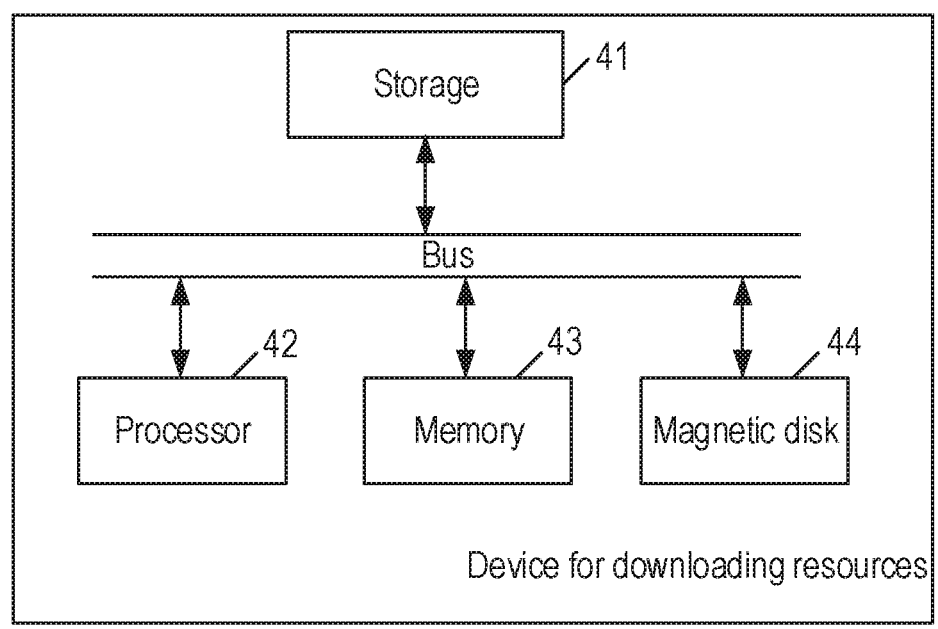
FIG. 4 is a schematic structural diagram of a device for downloading resources in Embodiment 3.

A device for downloading resources, applied to a P2P network. As shown in FIG. 4, the device may include:

a storage 41 storing a computer program; and a processor 42 configured to read the computer program so as to perform operations of the method for downloading resources described in Embodiment 1.

The device for downloading resources may also include: a memory 43. The processor 42 is configured to read the computer program so as to implement the following operation: writing data of a downloading task to the memory 43.

The device for downloading resources may also include: a magnetic disk 44. The processor 42 is configured to read the computer program so as to implement the following operation: determining whether the downloading task is complete when data in the memory reaches a preset upper limit of use, where the downloading task being complete indicates that a complete resource is able to be acquired by the downloading task; and writing the data in the memory 43 to the magnetic disk 44 when it is determined that the downloading task is complete.

It is noted that the device for downloading resources shown in FIG. 4 may include other components in addition to the storage 41, the processor 42, the memory 43, and the magnetic disk 44 described above. As an example, the device for downloading resources may further include a data storage for storing user data. As another example, the device for downloading resources may further include a communication circuit for communicating with an external device. As another example, the device for downloading resources may further include a bus for coupling parts of the device. As still another example, the device for downloading resources may further include an input component and an output component (e.g., a microphone, a speaker, a display, a keyboard, etc.). Additionally, the device described above may also include other components.

Embodiment 4

This embodiment also provides a computer-readable storage medium storing a computer program thereon, and the computer program, when executed by a processor, implements the steps of the method for downloading resources described above.

For other technical details of this embodiment, reference may be made to Embodiment 1.

Exemplary implementations of each of the above embodiments are described in detail below. It is noted that the examples below can be combined with one another. Also, the processes, execution processes, and the like in the examples below may be adapted to the needs of a practical application. In addition, in a practical application, the above embodiments can also have other implementations.

Example 1

In this example, an exemplary execution flow in a resource downloading process is described in detail.

Figure 5:
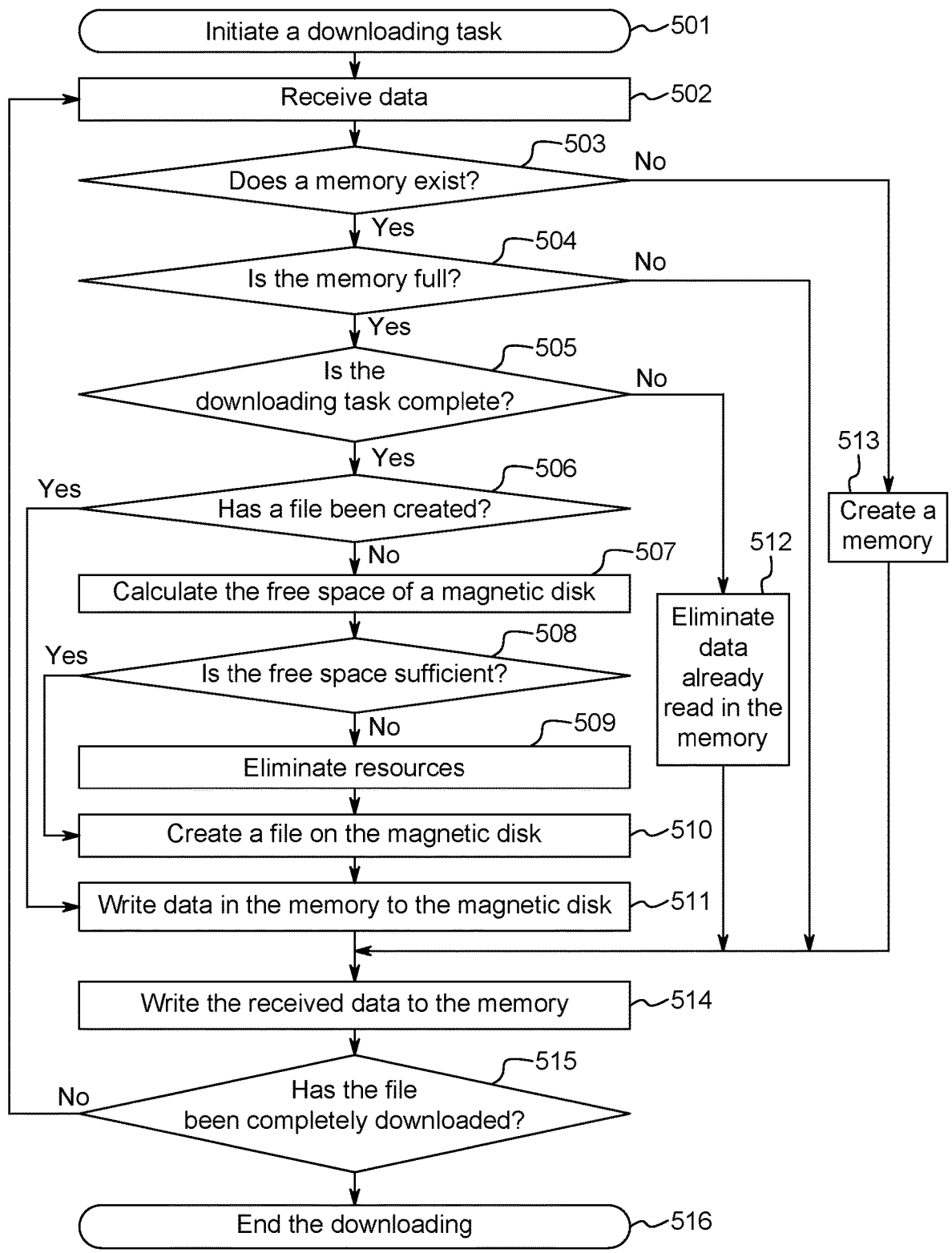
FIG. 5 is a schematic diagram of an exemplary execution flow for downloading resources in Example 1.

As shown in FIG. 5, the exemplary execution flow in a resource downloading process may include:

step 501: initiating a downloading task;

step 502: receiving data;

step 503: determining whether a memory exists, and if so, proceeding to step 504, and otherwise, proceeding to step 513;

step 504: determining whether the memory is full, and if the memory is full, proceeding to step 505, and if the memory is not full, proceeding to step 514;

step 505: verifying whether the downloading task is complete, i.e., verifying whether a complete resource file can be acquired by the downloading task, and if the downloading task is complete, proceeding to step 506, and if the downloading task is incomplete, that is, a complete resource file cannot be acquired by the downloading task, proceeding to step 512;

step 506: verifying whether a file has been created, and if a file has been created, proceeding to step 511, and if a file has not been created, proceeding to step 507;

step 507: calculating the free space of a magnetic disk;

step 508: determining whether the free space of the magnetic disk is sufficient to store the above resource file, and if the free space of the magnetic disk is sufficient to store the above resource file, proceeding to step 510, and if the free space of the magnetic disk is not sufficient to store the above resource file, proceeding to step 509;

step 509: eliminating resources so that the free space of the magnetic disk is sufficient to store the above resource file currently downloaded;

step 510: creating a file on the magnetic disk;

step 511: writing data in the memory to the magnetic disk and proceeding to step 514, where specifically, the created file is opened and the data in the memory is written to the magnetic disk through an opened file handle, and the file is closed after the data is completely written to the magnetic disk;

step 512: eliminating data already read in the memory and skipping to step 514;

step 513: creating a memory;

step 514: writing the received data to the memory;

step 515: determining whether the file has been completely downloaded, and if the file has been completely downloaded, proceeding to step 516, and if the file has not been completely downloaded, returning to step 502; and step 516: ending the downloading.

Example 2

In this example, a resource downloading process of P2P nodes of an entire P2P system is described in detail.

In the entire P2P system, a process of interaction among P2P nodes associated with resource downloading is as follows:

Phase 1: the resource downloading task is initiated, including the following steps:

step 1.1: receiving, by a P2P node downloading resources, an HTTP request used for playing a video and transmitted by an application;

step 1.2: acquiring, by the P2P node downloading resources, a URL by parsing the HTTP request transmitted by the application;

step 1.3: determining, by the P2P node downloading resources, whether the URL acquired by parsing the HTTP request transmitted by the application meets an acceleration criterion, and if not, requesting directly from a CDN, and otherwise continuing the process;

step 1.4: extracting, by the P2P node downloading resources, the feature information from the URL that is acquired by parsing the HTTP request from the application;

step 1.5: performing, by the P2P node downloading resources, an MD5 operation on the feature information extracted from the URL that is acquired by parsing the HTTP request from the application, generating an MD5 value and, in addition to the MD5 value, adding some auxiliary information so as to perform splicing to obtain a 40-character resource ID value; and step 1.6: initiating, by the P2P node downloading resources, the downloading task for the resource.

Phase 2: the P2P node downloading resources acquires resource information from a server (for example, a resource server), including the following steps:

step 2.1: requesting, by the P2P node downloading resources, the resource information from the server, where the request includes the resource ID information of the resource;

step 2.2: receiving, by the server, the request transmitted by the P2P node downloading resources;

step 2.3: parsing, by the server, the request from the P2P node downloading resources so as to acquire a resource ID;

step 2.4: according to the resource ID acquired through parsing in step 2.3, searching, by the server, a list of resources stored in a local memory for a corresponding resource, and if no corresponding resource has been found, returning to the P2P node downloading resources a notification message with empty acceleration information, and ending the process; and if the resource information has been found, proceeding to the next step;

step 2.5: packaging and transmitting, by the server, the resource information found in step 2.4 to the P2P node downloading resources, where the resource information can include: a resource ID, a resource size, an MD5 value for the entire resource, an MD5 value of block verification information, a node list, etc.;

step 2.6: receiving, by the P2P node downloading resources, a resource information package returned by the server;

step 2.7: parsing, by the P2P node downloading resources, the resource information package from the server so as to obtain the resource information; and step 2.8: storing, by the P2P node downloading resources, the resource information acquired through parsing in step 2.7 to a local memory.

Phase 3: block verification information is downloaded from a P2P node uploading resources, including the following steps:

step 3.1: selecting, by the P2P node downloading resources, node information of a P2P node uploading resources from the node list in the resource information stored in the local memory, where the node information can include: a public network address of the node, a public network port of the node, a Relay address of the node, a Relay port of the node, an address type of the node, etc.;

step 3.2: initiating, by the P2P node downloading resources, a connection request to the P2P node uploading resources selected in step 3.1;

step 3.3: establishing a network connection between the P2P node downloading resources and the P2P node uploading resources selected in step 3.1;

step 3.4: transmitting, by the P2P node downloading resources, a request for block verification information to the P2P node uploading resources with which the P2P node downloading resources has established a connection in step 3.3, where information included in the request can include: a resource ID, an MD5 value of block verification information, a size of block verification information, etc.;

step 3.5: receiving, by the P2P node uploading resources, the request for block verification information transmitted by the P2P node downloading resources;

step 3.6: acquiring, by the P2P node uploading resources, the resource ID, the MD5 value of block verification information, the size of block verification information, etc. by parsing the request received in step 3.5;

step 3.7: based on the resource ID, searching, by the P2P node uploading resources, the list of resources stored in the local memory to find out whether the resource exists, and if the resource has not been found, returning to the P2P node downloading resources a notification message indicating that no such resource exists, so as to notify the P2P node downloading resources that no such resource exists, and finishing the current process; and if the resource has been found, proceeding to step 3.8;

step 3.8: searching, by the P2P node uploading resources, the list of local resources according to step 3.7 to find out the resource information corresponding to the resource ID acquired through parsing in step 3.6, where the resource information can include: a resource ID, a resource size, an MD5 value of the entire resource, an MD5 value of block verification information, a file storage path, etc.;

step 3.9: comparing, by the P2P node uploading resources, the MD5 value of block verification information obtained in step 3.8 with the MD5 value of block verification information acquired through parsing in step 3.6, and determining whether the two values are consistent, and if the two values are inconsistent, returning to the P2P node downloading resources a notification message indicating that the files are inconsistent, and ending the current process or returning to step 3.1; and if the two values are consistent, proceeding to the next step;

step 3.10: opening, by the P2P node uploading resources, a file according to the file storage path found in step 3.8;

step 3.11: reading, by the P2P node uploading resources, block verification information according to the file opened in step 3.10;

step 3.12: packaging and returning, by the P2P node uploading resources, the block verification information read in step 3.11 to the P2P node downloading resources;

step 3.13: receiving, by the P2P node downloading resources, a block verification information package from the P2P node uploading resources; and step 3.14: parsing, by the P2P node downloading resources, the block verification information package received in step 3.13 so as to obtain the block verification information, and storing the block verification information in a local memory.

Phase 4: data is downloaded from a P2P node uploading resources, including the following steps:

step 4.1: splitting, by the P2P node downloading resources, an entire resource file into a plurality of small P2P tasks (i.e., downloading tasks), and forming a P2P task pool stored in a memory;

step 4.2: selecting, by the P2P node downloading resources, a P2P node uploading resources from the node list in the resource information stored in the local memory;

step 4.3: transmitting, by the P2P node downloading resources, a P2P task to the P2P node uploading resources selected in step 4.2, where the task information of the P2P task can include: a resource ID, an MD5 value of the entire resource, a starting position for a file, a size of a data block, etc.;

step 4.4: receiving, by the P2P node uploading resources, the P2P task transmitted by the P2P node downloading resources, and parsing the P2P task to obtain the following task information: the resource ID, the MD5 value of the entire resource, the starting position for a data block, the size of the data block, etc.;

step 4.5: based on the resource ID acquired through parsing in step 4.4, searching, by the P2P node uploading resources, the list of resources stored locally for a corresponding resource, and if the resource has not been found, returning to the P2P node downloading resources a notification message indicating that no such resource exists; and if the resource has been found, proceeding to step 4.6;

step 4.6: searching, by the P2P node uploading resources, for local resource information, where the resource information can include: a resource ID, a resource size, an MD5 value of the entire resource, an MD5 value of block verification information, a file storage path, etc.;

step 4.7: comparing, by the P2P node uploading resources, the MD5 value of the entire resource found in step 4.6 with the MD5 value of the entire file acquired through parsing in step 4.4, and if the two values are inconsistent, returning to the P2P node downloading resources a notification message indicating that the files are inconsistent, and if the two values are consistent, proceeding to the next step;

step 4.8: opening, by the P2P node uploading resources, a file according to the file storage path found in step 4.6;

step 4.9: calculating, by the P2P node uploading resources, the to-be-verified data block according to the starting position of the data block and the size of the data block acquired through parsing in step 4.4, where for example, if a starting position is 8 KB and a size of a data block is 9 KB, a corresponding Range is [8 KB, 17 KB); and if a size of the to-be-verified block is 10 KB, a requested data block falls within two blocks [0 KB, 10 KB) and [10 KB, 20 KB);

step 4.10: reading, by the P2P node uploading resources, the to-be-verified data block calculated in step 4.9 from the file opened in step 4.8;

step 4.11: calculating, by the P2P node uploading resources, an MD5 value of each data block for the data blocks read in step 4.10;

step 4.12: reading, by the P2P node uploading resources, block verification information from the file opened in step 4.8;

step 4.13: extracting, by the P2P node uploading resources, an MD5 value of the data block to be verified in step 4.9 from the block verification information in step 4.12;

step 4.14: comparing, by the P2P node uploading resources, the MD5 value calculated in step 4.11 with the MD5 value extracted in step 4.13, and if the two values are inconsistent, returning to the P2P node downloading resources a notification message indicating an error in data; and if the two values are consistent, proceeding to the next step;

step 4.15: reading, by the P2P node uploading resources, the data block acquired through parsing in step 4.4 from data blocks successfully verified, where for example, the data block [8 KB, 17 KB) is read from two blocks [0 KB, 10 KB) and [10 KB, 20 KB);

step 4.16: returning, by the P2P node uploading resources, the data read in step 4.15 to the P2P node downloading resources; and step 4.17: receiving, by the P2P node downloading resources, the data transmitted by the P2P node uploading resources, and storing the data in a local memory or writing the data to a magnetic disk file.

Stage 5: data is written to a magnetic disk, including the following steps:

step 5.1: creating, by the P2P node downloading resources, a resource file named after a resource ID under a specified magnetic disk directory after a downloading task is initiated, and recording a file storage path in a memory at the same time;

step 5.2: opening, by the P2P node downloading resources, the resource file;

step 5.3: writing, by the P2P node downloading resources, block verification information in the resource information stored in a local memory to the file opened in step 5.2;

step 5.4: repeating, by the P2P node downloading resources, Phase 4 to receive data;

step 5.5: calculating, by the P2P node downloading resources, an MD5 value of a current block after the receipt of data of the block (e.g., the 0-th block [0 KB, 10 KB)) has been completed;

step 5.6: extracting, by the P2P node downloading resources, the corresponding MD5 value from the block verification information in step 5.3 according to a block number, where for example, in the block verification information, the 0-th block has an MD5 value of AAAAAAAAAAAAAAAA;

step 5.7: comparing, by the P2P node downloading resources, the MD5 value calculated in step 5.5 with the MD5 value extracted in step 5.6, where if the two MD5 values are consistent, it is indicated that the data is correct, and if the two MD5 values are inconsistent, it is indicated that an error occurs in data and the data needs to be deleted and re-downloaded; and step 5.8: writing, by the P2P node downloading resources, data verified as correct in step 5.7 to the file opened in step 5.2.

It is understood by those of ordinary skill in the art that all or part of the steps in the method described above can be executed by related hardware instructed by a program that can be stored in a computer-readable storage medium, such as a read-only memory, a magnetic disk, an optical disk, or the like. Optionally, all or part of the steps of the above embodiments can also be implemented using one or a plurality of integrated circuits. Accordingly, each module/unit in the above embodiments can be implemented in the form of hardware, and can also be implemented in the form of a software functional module. The present application is not limited to any specific form of combination of hardware and software.

The present invention can have a plurality of other embodiments and, without departing from the spirit and essence of the present invention, those skilled in the art can make various corresponding changes and modifications in accordance with the present invention, and such corresponding changes and modifications shall fall within the protection scope of the claims of the present application.

The invention claimed is:

1. A method for downloading resources, applied to a peer-to-peer (P2P) network, the method comprising:
   initiating a downloading task according to a downloading request from a resource requester;
   acquiring data of the downloading task and writing the data of the downloading task to a memory;
   reading the data from the memory and providing the data to the resource requester; and
   writing the data in the memory to a magnetic disk based on a determination that the downloading task is complete when the data in the memory reaches a preset upper limit of use.

2. The method according to claim 1, wherein the method further comprises:
   determining whether the downloading task is complete when the data in the memory reaches the preset upper limit of use, wherein the downloading task being complete indicates that a complete resource is able to be acquired by the downloading task; and
   filtering out the downloading task when the downloading task is incomplete so that the data in the memory will not be written to the magnetic disk.

3. The method according to claim 2, wherein the method further comprises:
   determining whether the downloading task is complete according to Range information in the downloading request.

4. The method according to claim 3, wherein the method further comprises one or two of the following:
   determining whether the Range information in the downloading request starts from 0, and determining that the downloading task is complete if the Range information starts from 0; and
   identifying, according to the Range information in the downloading request, whether the downloading request corresponds to a Seek operation, and determining that the downloading task is incomplete if the downloading request corresponds to the Seek operation.

5. The method according to claim 4, wherein the identifying, according to the Range information in the downloading request, whether the downloading request corresponds to the Seek operation, comprises:
   determining, according to the Range information in the downloading request and Range information of a corresponding downloading task already existing in the memory, whether data corresponding to the downloading request is able to be spliced into a complete resource with corresponding data already existing in the memory; and
   determining, if the data corresponding to the downloading request is able to be spliced into the complete resource with the corresponding data already existing in the memory, that the downloading request does not correspond to the Seek operation.

6. The method according to claim 2, wherein:
   the filtering out the downloading task when the downloading task is incomplete comprises: setting a downloading mode of the downloading task as a memory mode when the downloading task is incomplete, wherein the data in the memory will not be written to the magnetic disk in the memory mode; and
   the writing the data in the memory to the magnetic disk when the downloading task is complete comprises: setting the downloading mode of the downloading task as a mode of magnetic disk+memory when the downloading task is complete, wherein the data in the memory will be written to the magnetic disk in the mode of magnetic disk+memory.

7. The method according to claim 6, wherein:
   the downloading mode of the downloading task is set by resetting a downloading mode parameter of the downloading task.

8. The method according to claim 1, wherein the method further comprises:
   determining whether the downloading task is complete when the data in the memory reaches the preset upper limit of use, wherein the downloading task being complete indicates that a complete resource is able to be acquired by the downloading task.

9. The method according to claim 8, wherein the writing the data in the memory to the magnetic disk comprises:
   when the data in the memory reaches the preset upper limit of use and the downloading task is complete, creating a file in the magnetic disk and writing the data in the memory to the file, or directly opening a file corresponding to the downloading task and writing the data in the memory to the opened file.

10. The method according to claim 8, wherein the writing the data in the memory to the magnetic disk comprises:
    splicing the data in the memory into a continuous data block and writing the continuous data block to the magnetic disk.

11. The method according to claim 8, wherein the method further comprises:
    when the data in the memory reaches the preset upper limit of use and the downloading task is complete, analyzing free space of the magnetic disk; and if the free space of the magnetic disk is not sufficient to store the data in the memory, performing an elimination operation on resources so as to write the data in the memory to the magnetic disk.

12. The method according to claim 1, wherein acquiring the data of the downloading task and writing the data of the downloading task to the memory comprises:
    initially allocating one or a plurality of fixed-sized memory blocks to the downloading task, and writing the data of the downloading task to the memory through recycling of the memory block(s).

13. The method according to claim 12, wherein, after the data in the memory is written to the magnetic disk, a memory block occupied by the data in the memory is released.

14. The method according to claim 12, wherein, after the data is read from the memory and provided to the resource requester, a memory block occupied by the data in the memory is released.

15. The method according to claim 1, wherein acquiring the data of the downloading task and writing the data of the downloading task to the memory comprises:
    initially allocating one or a plurality of fixed-sized memory blocks to the downloading task;
    writing the data of the downloading task to the memory block(s) upon receipt of the data; when the memory block(s) is/are full, releasing part or all of the memory block(s) for use by subsequent data received; and
    repeating such an operation until the downloading task is completed.

16. A device for downloading resources, applied to a peer to peer (P2P) network, the device comprising:

an initiating module for initiating a downloading task according to a downloading request from a resource requester;

an acquisition module for acquiring data of the downloading task;

a memory module for writing the data of the downloading task to a memory;

a providing module for reading the data from the memory and providing the data to the resource requester; and a magnetic-disk writing module for writing the data in the memory to a magnetic disk based on a determination that the downloading task is complete when the data in the memory reaches a preset upper limit of use.

17. The device according to claim 16, wherein the device further comprises:

a determining module for determining whether the downloading task is complete when the data in the memory reaches the preset upper limit of use, wherein the downloading task being complete indicates that a complete resource is able to be acquired by the downloading task; and a filtering module for filtering out the downloading task when the downloading task is incomplete so that the data in the memory will not be written to the magnetic disk.

18. The device according to claim 17, wherein the determining module is specifically configured to determine whether the downloading task is complete according to Range information in the downloading request.

19. The device according to claim 18, wherein the determining module is specifically configured to determine whether the downloading task is complete by one or two of the following ways:

determining whether the Range information in the downloading request starts from 0, and determining that the downloading task is complete if the Range information starts from 0; and identifying, according to the Range information in the downloading request, whether the downloading request corresponds to a Seek operation, and determining that the downloading task is incomplete if the downloading request corresponds to the Seek operation.

20. The device according to claim 17, wherein the magnetic-disk writing module is specifically configured to: when the data in the memory reaches the preset upper limit of use and the downloading task is complete, create a file in the magnetic disk and write the data in the memory to the file, or directly open a file corresponding to the downloading task and write the data in the memory to the opened file.

* * * * *